(12) United States Patent
Harada et al.

(10) Patent No.: US 10,851,248 B2
(45) Date of Patent: Dec. 1, 2020

(54) METHOD FOR PRODUCING AQUEOUS RESIN DISPERSION

(71) Applicant: Mitsubishi Chemical Corporation, Chiyoda-ku (JP)

(72) Inventors: Akira Harada, Chiyoda-ku (JP); Shinsuke Haraguchi, Chiyoda-ku (JP); Motomi Tanaka, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/211,543

(22) Filed: Dec. 6, 2018

(65) Prior Publication Data
US 2019/0106575 A1    Apr. 11, 2019

Related U.S. Application Data

(63) Continuation of application No. PCT/JP2017/021462, filed on Jun. 9, 2017.

(30) Foreign Application Priority Data

Jun. 9, 2016  (JP) .................................. 2016-115151

(51) Int. Cl.
| | |
|---|---|
| C09D 4/06 | (2006.01) |
| C09D 7/20 | (2018.01) |
| C09D 133/06 | (2006.01) |
| C09D 133/12 | (2006.01) |
| C09D 171/00 | (2006.01) |
| C09D 201/00 | (2006.01) |
| C09D 5/00 | (2006.01) |
| C09D 123/00 | (2006.01) |
| C09D 123/26 | (2006.01) |
| C09D 123/28 | (2006.01) |
| C08F 2/24 | (2006.01) |
| C08F 255/00 | (2006.01) |

(52) U.S. Cl.
CPC .................. C09D 4/06 (2013.01); C08F 2/24 (2013.01); C08F 255/00 (2013.01); C09D 5/00 (2013.01); C09D 5/002 (2013.01); C09D 7/20 (2018.01); C09D 123/00 (2013.01); C09D 123/26 (2013.01); C09D 123/28 (2013.01); C09D 133/06 (2013.01); C09D 133/12 (2013.01); C09D 171/00 (2013.01); C09D 201/00 (2013.01)

(58) Field of Classification Search
CPC ... C09D 4/06; C09D 7/20; C09D 5/00; C09D 5/002; C09D 123/00; C09D 123/26; C09D 123/28; C09D 133/06; C09D 133/12; C09D 171/00; C09D 201/00; C08F 2/24; C08F 255/00
USPC .......................................................... 524/458
See application file for complete search history.

(56) References Cited

U.S. PATENT DOCUMENTS

| | | | |
|---|---|---|---|
| 2007/0245929 A1 | 10/2007 | Asami et al. | |
| 2009/0061247 A1* | 3/2009 | Chino | ................... C08F 255/00 428/500 |
| 2009/0163635 A1 | 6/2009 | Raynolds et al. | |

FOREIGN PATENT DOCUMENTS

| | | |
|---|---|---|
| EP | 2 030 999 A1 | 3/2009 |
| JP | 51-44146 | 4/1976 |
| JP | 57-137339 | 8/1982 |
| JP | 8-73600 | 3/1996 |
| JP | 9-157314 | 6/1997 |
| JP | 2000-264933 | 9/2000 |
| JP | 2002-308921 | 10/2002 |
| JP | 2004-91559 | 3/2004 |
| JP | 2005-60485 | 3/2005 |
| JP | 2005-272621 | 10/2005 |
| JP | 2006-36920 | 2/2006 |
| JP | 2008-163130 | 7/2008 |
| JP | 2009-74047 | 4/2009 |
| JP | 2010-1334 | 1/2010 |
| JP | 2011-46777 | 3/2011 |
| JP | 2011-508006 | 3/2011 |
| JP | 2013-133417 | 7/2013 |
| WO | WO 2004/101679 A1 | 11/2004 |

* cited by examiner

*Primary Examiner* — Kelechi C Egwim
(74) *Attorney, Agent, or Firm* — Oblon, McClelland, Maier & Neustadt, L.L.P.

(57) ABSTRACT

The invention is to provide a method for producing an aqueous resin dispersion capable of forming a coating film superior in adhesion to a polypropylene base material, and water resistance. Specifically, the invention provides a method for producing an aqueous resin dispersion, including a step of mixing and polymerizing a polyolefin dispersion (A), a radically polymerizable monomer (B), and a surfactant for emulsion polymerization (C), wherein the amount of the radically polymerizable monomer (B) mixed is 0.5 to 2 times the solid component of the polyolefin dispersion (A) in terms of parts by mass, and the amount of the solid component of the surfactant for emulsion polymerization (C) mixed is 0 to 3 parts by mass with respect to 100 parts by mass of the radically polymerizable monomer (B).

3 Claims, No Drawings

METHOD FOR PRODUCING AQUEOUS RESIN DISPERSION

TECHNICAL FIELD

The present invention relates to a method for producing an aqueous resin dispersion containing a polyolefinic resin.

BACKGROUND ART

Since polyolefins such as a propylene polymer and a propylene/α-olefin copolymer are inexpensive and are excellent in mechanical properties, heat resistance, chemical resistance, water resistance, and the like, they are used in a wide range of fields. However, since polyolefins have low polarity due to lack of a polar group in the molecule, coating or bonding of the same is often difficult, and therefore mitigation of this drawback has been desired.

For this reason, various studies, such as a method of chemically treating the surface of a molded article of polyolefin with a chemical agent, a method of oxidizing the surface of a molded article by a corona discharge treatment, a plasma treatment, a flame treatment, or the like have been conducted. However, these methods not only require special equipment, but also their improvement effects on coatability or adhesion have been not adequate.

In addition, as a devise for imparting good coatability or adhesion to a polyolefin, for example, aa polypropylene base material, by a relatively simple method, a method of coating the surface of a molded article of polyolefin with a modified polyolefin, such as a so-called chlorinated polypropylene and acid-modified propylene/α-olefin copolymer, and an acid-modified chlorinated polypropylene, as a surface treating agent, an adhesive, a coating material, or the like, has been known. The modified polyolefin is usually applied in the form of a solution in an organic solvent, or an aqueous dispersion. From the viewpoints of safety and hygiene, as well as environmental pollution, the form of an aqueous dispersion is preferably used.

In order to improve the performance as a coating material and the storage stability, an aqueous resin dispersion in which a modified polyolefin and a radically polymerized polymer are combined has been developed. For example, Patent Literature 1 and 2 describe a method by which an aqueous resin dispersion of a graft copolymer obtained by grafting a hydrophilic polymer to an olefinic polymer, and an aqueous dispersion of a vinyl type monomer containing a surfactant are mixed and polymerized by emulsion polymerization. Patent Literature 3 describes a method by which a modified polyolefin and a surfactant are dissolved in a vinyl type monomer, and then dispersed in water, and thereafter emulsion polymerization is performed to yield an aqueous resin composition. Further, Patent Literature 4 and 5 describe a method by which a vinyl type monomer is dispersed in water in the presence of a chlorinated polyolefinic resin using a surfactant, and emulsion polymerization is performed to yield an aqueous resin composition.

CITATION LIST

Patent Literature

Patent Literature 1: JP2011-46777A
Patent Literature 2: JP2013-133417A
Patent Literature 3: JP2006-036920A
Patent Literature 4: JP2004-91559A
Patent Literature 5: JP2002-308921A

SUMMARY OF INVENTION

Technical Problem

However, by the method described in Patent Literature 1 and 2, a radically polymerized polymer obtained from a vinyl monomer hindered the adhesion to a polypropylene base material and the adhesion was inadequate. Also, by the method described in Patent Literature 3 to 5, there was a drawback in that, for example, a large amount of surfactant was contained in an aqueous resin composition of polyolefin, and water resistance was not sufficient.

An object of the present invention is to eliminate such drawbacks and to provide a method for producing an aqueous resin dispersion capable of forming a coating film superior in adhesion to a polypropylene base material, and water resistance

Solution to Problem

The present inventors have diligently studied to achieve the object to arrive at the present invention. That is, the present invention relates to the following [1] to [6].

[1] A method for producing an aqueous resin dispersion, including a polymerization step of mixing and polymerizing a polyolefin dispersion (A), a radically polymerizable monomer (B), and a surfactant for emulsion polymerization (C), wherein in the polymerization step the amount of the radically polymerizable monomer (B) mixed at the time of adding a polymerization initiator is 0.5 to 2 times the solid component of the polyolefin dispersion (A) in terms of parts by mass, and the amount of the solid component of the surfactant for emulsion polymerization (C) mixed is 0 to 3 parts by mass with respect to 100 parts by mass of the total amount of the radically polymerizable monomer (B).

[2] The method for producing an aqueous resin dispersion according to [1], wherein the polymerization step includes an operation of all-in polymerization of 50 to 100 mass % of all the radically polymerizable monomer (B) used for production of the aqueous resin dispersion with a polymerization initiator.

[3] A method for producing an aqueous resin dispersion, including a polymerization step of polymerizing a radically polymerizable monomer (B) in the presence of a polyolefin dispersion (A), and a surfactant for emulsion polymerization (C), wherein the polymerization step includes an operation of all-in polymerization of the radically polymerizable monomer (B) in an amount of 50 to 100 mass % of the total amount of the radically polymerizable monomer (B) used for production of the aqueous resin dispersion with a polymerization initiator, and the amount of the surfactant for emulsion polymerization (C) used is 0 to 3 parts by mass with respect to 100 parts by mass of the total amount of the radically polymerizable monomer (B) used for producing the aqueous resin dispersion.

[4] The method for producing an aqueous resin dispersion according to [1] to [3], wherein the polyolefin dispersion (A) does not contain a halogen atom.

[5] The method for producing an aqueous resin dispersion according to any one of [1] to [4], wherein the polyolefin dispersion (A) is prepared by dispersing in a dispersion medium a polyolefin, and a polyether resin (D) having a HLB of 1 to 8 calculated by the Griffin method.

[6] The method for producing an aqueous resin dispersion according to any one of [1] to [5], wherein the aqueous resin dispersion is used for a primer.

Advantageous Effects of Invention

According to the production method of the present invention, an aqueous resin dispersion capable of forming a coating film superior in adhesion to a polypropylene base material, and water resistance can be provided.

DESCRIPTION OF EMBODIMENTS

The present invention will be described in detail below by way of preferred Embodiments.

An embodiment of the present invention is a method for producing an aqueous resin dispersion, including a step of mixing and polymerizing a polyolefin dispersion (A), a radically polymerizable monomer (B), and a surfactant for emulsion polymerization (C), wherein the amount of the radically polymerizable monomer (B) mixed is 0.5 to 2 times the solid component of the polyolefin dispersion (A) in terms of parts by mass, and the amount of the solid component of the surfactant for emulsion polymerization (C) mixed is 0 to 3 parts by mass with respect to 100 parts by mass of the radically polymerizable monomer (B).

Another embodiment of the present invention is a method for producing an aqueous resin dispersion, including a polymerization step of polymerizing a radically polymerizable monomer (B) in the presence of a polyolefin dispersion (A), and a surfactant for emulsion polymerization (C), wherein the polymerization step includes an operation of all-in polymerization of 50 to 100 mass % of all the radically polymerizable monomer (B) used for production of the aqueous resin dispersion with a polymerization initiator, and the amount of the surfactant for emulsion polymerization (C) used is 0 to 3 parts by mass with respect to 100 parts by mass of the total amount of the radically polymerizable monomer (B) used for producing the aqueous resin dispersion.

<Polyolefin Dispersion (A)>

A polyolefin dispersion (A) means in the present invention means a dispersion of an olefin polymer (hereinafter also referred to as "polyolefin") in which an olefin polymer is dispersed in water and/or a solvent other than water. Meanwhile, an olefin polymer refers to a polymer including an olefin as a main constituent unit, and includes an olefinic polymer (A1) (hereinafter also referred to as "polymer (A1)"), such as a homopolymer, or a copolymer of an olefin, and the like.

[Olefinic Polymer (A1)]

Examples of the olefinic polymer (A1) (polymer (A1)) include an olefinic polymer not having a reactive group (A11) (hereinafter also referred to as "polymer (A11)"), and a modified olefinic polymer having a reactive group (A12) (hereinafter also referred to as "polymer (A12)").

Examples of a preferable embodiment of the polymer (A1) include a propylene-based polymer satisfying the following (1) and (2).

(1) A propylene content is 50 mol % or more. The propylene content is more preferably 60 mol % or more, and further preferably 70 mol % or more.

(2) A melting point (Tm) is 125° C. or less. The Tm is more preferably 100° C. or less, and further preferably 90° C. or less. Furthermore, the Tm is preferably 60° C. or more.

(Olefinic Polymer not Having Reactive Group (A11))

As the olefinic polymer not having a reactive group (A11) (polymer (A11)), various known olefinic polymers and olefinic copolymers can be used. Specific examples thereof may include, but not limited to, the following polyolefins. A homopolymer of ethylene, or propylene; a copolymer of ethylene and propylene; a copolymer of ethylene and/or propylene and another comonomer (for example, an α-olefin comonomer having 2 or more carbon atoms, such as butene-1, pentene-1, hexene-1, heptene-1, octene-1, cyclopentene, cyclohexene, and norbornene); a copolymer composed of two or more kinds selected from the above-listed comonomers; a copolymer of an α-olefin monomer with a comonomer such as vinyl acetate, an acrylic acid ester, and a methacrylic acid ester; a copolymer of an α-olefin monomer with a comonomer such as an aromatic vinyl monomer, or a hydrogenated product thereof; and a conjugated diene block copolymer, or a hydrogenated product thereof. The simple term of a "copolymer" may mean herein either of a random copolymer or a block copolymer.

As the α-olefin comonomer having 2 or more carbon atoms, an α-olefin comonomer having 2 to 4 carbon atoms is preferable. Further, as the polymer (A11), a halogenated polyolefin obtained by halogenating the polyolefin can also be used. Examples of the halogenated polyolefin include a chlorinated polyolefin. In that case, the degree of chlorination of the chlorinated polyolefin is usually 5 mass % or more, and preferably 10 mass % or more. Meanwhile, the degree of chlorination is usually 40 mass % or less, and preferably 30 mass % or less.

Specific examples of the polymer (A11) include polyethylene, polypropylene, an ethylene/butene copolymer, an ethylene/propylene copolymer, a propylene/butene copolymer, a propylene/hexene copolymer, chlorinated polyethylene, chlorinated polypropylene, a chlorinated ethylene/propylene copolymer, a chlorinated propylene/butene copolymer, an ethylene/vinyl acetate copolymer, a hydrogenated product of a styrene/butadiene/styrene block copolymer (SEBS), and a hydrogenated product of a styrene/isoprene/styrene block copolymer (SEPS). These polymers (A11) may be used singly, or in combination of two or more kinds thereof.

As the polymer (A11), a propylene homopolymer, or a copolymer of propylene and an α-olefin other than propylene, which may be chlorinated, is preferable. As the polymer (A11), a propylene homopolymer, an ethylene/propylene copolymer, a propylene/butene copolymer, a chlorinated polypropylene, a chlorinated ethylene/propylene copolymer, or a chlorinated propylene/butene copolymer is more preferable. Further, it is more preferable that the polymer (A11) does not contain a halogen atom such as a chlorine atom, and a propylene homopolymer, an ethylene/propylene copolymer, a propylene/butene copolymer, or an ethylene/propylene/butene copolymer, which does not contain a halogen atom, is particularly preferable.

Further, as the polymer (A11), a propylene-based polymer containing propylene as its constituent unit is preferable. The content of propylene in the propylene-based polymer is preferably 50 mol % or more, more preferably 60 mol % or more, and further preferably 70 mol % or more. Normally, as the content of propylene increases, the adhesion to a polypropylene base material tends to increase.

The weight average molecular weight (Mw) of the polymer (A11) measured using GPC
(Gel Permeation Chromatography), and converted with a calibration curve for each polyolefin is preferably from 5,000 to 500,000. The lower limit value is more preferably 10,000, further preferably 20,000, and particularly preferably 30,000. The upper limit value is more preferably 300,000. As the Mw becomes higher beyond 5,000, the degree of stickiness decreases and the adhesion to a base material tends to increase. Also, as Mw becomes lower below 500,000, the viscosity decreases, and the preparation of an aqueous resin dispersion tends to become easier. Meanwhile, a GPC measurement is carried out by a heretofore known method using a commercially available apparatus with a solvent such as o-dichlorobenzene.

The melting point (Tm) of the polymer (A11) is preferably 125° C. or less. The lower limit value is preferably 60° C. or more, and a more preferable upper limit value is 100° C. or less, and a further preferable value is 90° C. or less. In a case where the melting point is 60° C. or more, resin stickiness does not appear, and handling becomes easy when used as a coating material. Further, the melting point is preferably 125° C. or less, because drying and baking do not require a high temperature.

There is no particular restriction on a method for producing the polymer (A11), insofar as it is a method capable of producing a polymer satisfying the requirements of the present invention, and any production method may be used. Examples of the production method include radical polymerization, cationic polymerization, anionic polymerization, and coordination polymerization. These may be kind of living polymerization.

In the case of coordination polymerization, examples thereof include a polymerization method with a Ziegler-Natta catalyst, and a polymerization method with a single site catalyst. A preferable production method is for example a production method using a single site catalyst. The reason for this is, for example, that a single site catalyst can generally sharpen a molecular weight distribution or a stereoregularity distribution by designing the ligand. Further, as the single site catalyst, for example, a metallocene catalyst, or a Brookhart catalyst can be used. As the metallocene catalyst, those having a symmetry type, such as C1 symmetry type, C2 symmetry type, C2V symmetry type, and CS symmetry type, are known. In the present invention, a metallocene catalyst with an appropriate symmetry type may be selected for use corresponding to the stereoregularity of a polyolefin to be polymerized.

The polymerization may be performed in any form such as solution polymerization, slurry polymerization, bulk polymerization, gas phase polymerization, or the like. In the case of solution polymerization or slurry polymerization, examples of a solvent include an aromatic hydrocarbon, such as toluene, and xylene; an aliphatic hydrocarbon, such as hexane, heptane and octane; an alicyclic hydrocarbon, such as cyclohexane, and methylcyclohexane; a halogenated hydrocarbon; an ester; a ketone; and an ether. Among these, an aromatic hydrocarbon, an aliphatic hydrocarbon, and an alicyclic hydrocarbon are preferable, and toluene, xylene, heptane, and cyclohexane are more preferable. These may be used singly, or in combination of two or more kinds thereof. The polymer (A11) may be in a straight chain or branched form.

(Modified Olefinic Polymer Having Reactive Group (A12))

Examples of the modified olefinic polymer having a reactive group (A12) (polymer (A12)) include a copolymer (A12a) obtained by copolymerizing an olefin and an unsaturated compound having a reactive group at the time of polymerization, and a graft polymer (A12b) obtained by graft polymerization of a radically polymerizable unsaturated compound having a reactive group to an olefinic polymer.

The copolymer (A12a) is obtained by copolymerizing an olefin with an unsaturated compound having a reactive group, and is a copolymer in which main chain the unsaturated compound having a reactive group is inserted. Example thereof include a copolymer obtained by copolymerizing an α-olefin, such as ethylene, propylene, and butene with an α,β-unsaturated carboxylic acid or anhydride, such as acrylic acid, and maleic anhydride. Specific examples of the copolymer (A12a) include an ethylene/acrylic acid copolymer, and an ethylene/acrylic ester/maleic anhydride copolymer. These may be used singly, or in combination of two or more kinds thereof. As a method for producing the copolymer (A12a), the same method as described for the polymer (A11) can be used.

The graft polymer (A12b) is obtained by graft polymerization of a radically polymerizable unsaturated compound having a reactive group to an olefinic polymer. As the olefinic polymer, the above polymer (A11) may be used. Examples of the reactive group in the radically polymerizable unsaturated compound having a reactive group include a carboxyl group and its anhydride, an amino group, an epoxy group, an isocyanate group, a sulfonyl group, and a hydroxy group. Among these, a carboxyl group and its anhydride are preferable. Examples of the radically polymerizable unsaturated compound having a reactive group include (meth)acrylic acid, fumaric acid, maleic acid or its anhydride, itaconic acid or its anhydride, and crotonic acid. These may be used singly, or in combination of two or more kinds thereof. "(Meth)acrylic acid" is a collective term for acrylic acid and methacrylic acid, and this applies mutatis mutandis also to analogs.

Specific examples of the graft polymer (A12b) include maleic anhydride-modified polypropylene and its chlorinated product, a maleic anhydride-modified ethylene/propylene copolymer and its chlorinated product, a maleic anhydride-modified propylene/butene copolymer, an acrylic acid-modified polypropylene and its chlorinated product, an acrylic acid-modified ethylene/propylene copolymer and its chlorinated product, and an acrylic acid-modified propylene/butene copolymer. These may be used singly, or in combination of two or more kinds thereof.

As a radical polymerization initiator used for the graft polymerization, appropriate one may be selected from conventional radical polymerization initiators and used, and examples thereof may include an organic peroxide and azonitrile. Examples of the organic peroxide may include a peroxyketal, such as di(t-butylperoxy)cyclohexane; a hydroperoxide, such as cumene hydroperoxide; a dialkyl peroxide, such as di(t-butyl) peroxide; a diacyl peroxide, such as benzoyl peroxide; and a peroxyester, such as t-butylperoxy isopropyl monocarbonate. Examples of the azonitrile include azobisbutyronitrile, and azobisisopropylnitrile. Among these, benzoyl peroxide and t-butylperoxy isopropyl monocarbonate are preferable. These may be used singly, or in combination of two or more kinds thereof.

The ratio of a radical polymerization initiator to a graft copolymerization portion of the graft polymer (A12b) used is usually in the following range: Radical polymerization initiator:Graft copolymerization portion=1:100 to 2:1 (part by mass), and it is preferably in a range of 1:20 to 1:1. The reaction temperature of the graft polymerization is usually 50° C. or more, and preferably in a range of 80 to 200° C. The reaction time of the graft polymerization is usually about 2 to 20 hours.

There is no particular restriction on the method for producing a graft polymer (A12b), and any production method may be used insofar as a polymer satisfying the requirements of the present invention can be produced. Examples of the production method include a production method by which a reactant solution is stirred with heating, a production method by which a molten reactant is agitated with heating without a solvent, and a production method by which a reactant is kneaded with heating in an extruder. Two or more of these methods may be used in combination. As the solvent for production in a solution, the same solvents presented as examples in the method for producing the polymer (A11) may be used.

The content of a reactive group in the graft polymer (A12b) obtained by graft polymerization of the radically polymerizable unsaturated compound having a reactive group to an olefinic polymer is preferably in a range of 0.01 to 1 mmol per 1 g of the olefinic polymer, namely 0.01 to 1 mmol/g. The lower limit value is more preferably 0.05 mmol/g, and further preferably 0.1 mmol/g. The upper limit value is more preferably 0.7 mmol/g, and further preferably 0.5 mmol/g. As the content of a reactive group increases beyond 0.01 mmol/g, the dispersed particle diameter tends to decrease because the hydrophilicity increases. Further, as the content of a reactive group decreases below 1 mmol/g, the adhesion to a polypropylene base material tends to increase.

In a case where a reactive group in the graft polymer (A12b) is an acidic group such as a carboxyl group or an anhydride thereof, and a sulfonyl group, it can be used as a polyolefin dispersion (A) by neutralizing the acidic group with a basic compound. Examples of the basic compound include an inorganic base, such as sodium hydroxide, potassium hydroxide and ammonia; and an organic base, such as triethylamine, diethylamine, ethanolamine, dimethylethanolamine, 2-methyl-2-aminopropanol, triethanolamine, morpholine, and pyridine. Although the neutralization rate by the basic compound is not particularly restricted within a range of 1 to 100 mol % insofar as the dispersibility in water is secured, it is preferably 50 mol % or more. When the neutralization rate is low, the dispersibility in water decreases.

[Solvent Other than Water]

The proportion of a solvent other than water contained in a polyolefin dispersion (A) with respect to the total dispersion is preferably 50 mass % or less, more preferably 20 mass % or less, and further preferably 10 mass % or less. When the proportion of the solvent other than water is 10 mass % or less, the storage stability tends to be excellent. Further, as the solvent other than water, a solvent that is soluble in water by 1 mass % or more is preferable, and a solvent that dissolves in water by 5 mass % or more is more preferable. Examples of such a solvent include methyl ethyl ketone, cyclohexanone, n-propanol, isopropanol, n-butanol, isobutanol, t-butanol, cyclohexanol, tetrahydrofuran, 2-methoxyethanol, 2-ethoxyethanol, 2-butoxyethanol, 2-methoxypropanol, and 2-ethoxypropanol. These may be used singly, or in combination of two or more kinds thereof.

The method for producing a polyolefin dispersion (A) according to the present invention may be a method of dispersing an olefinic polymer (A1) by adding a surfactant thereto, or a method of dispersing an olefinic polymer (A1) using a graft copolymer in which a hydrophilic polymer is grafted thereto. A polyolefin dispersion (A) is preferably a dispersion obtained using a graft copolymer prepared by grafting a hydrophilic polymer to an olefinic polymer (A1) not containing a surfactant. The thus obtained dispersion is excellent in water resistance, because it does not substantially contain a surfactant.

The hydrophilic polymer used for producing a polyolefin dispersion (A) according to the present invention refers to a polymer in which the content of an insoluble matter is 1 mass % or less, when dissolved at a concentration of 10 mass % in water at 25° C. There is no particular restriction on the hydrophilic polymer, insofar as the advantageous effects of the present invention are not strongly compromised, and any of a synthetic polymer, a semisynthetic polymer, and a natural polymer may be used. Usually, the number average molecular weight Mn of the hydrophilic polymer is preferably 300 or more, because the polyolefin dispersion (A) can have excellent mechanical stability.

In the present invention, a dispersion is a concept even including a state where dispersed particles are dispersed extremely finely in a monomolecular state, namely a state where they are substantially dissolved. Therefore, there is no particular restriction on the lower limit of the average particle diameter of a polyolefin dispersion (A), and it may be 0 μm (a state in which the dispersion is completely dissolved). The average particle diameter of a polyolefin dispersion (A) used in the present invention is preferably 1 μm or less, more preferably 0.5 μm or less, and further preferably 0.2 μm or less. When the average particle diameter is decreased, the dispersion stability is improved, and aggregation is suppressed. An average particle diameter can be measured by a dynamic light scattering method, a laser Doppler method, or the like.

The solid content in a polyolefin dispersion (A) is preferably 5 mass % or more, more preferably 10 mass % or more, and further preferably 20 mass % or more. The solid content is preferably 70 mass % or less, more preferably 60 mass % or less, and further preferably 50 mass % or less. As the solid content decreases below 60 mass %, the viscosity tends to decrease, and the polymerizability with a radically polymerizable monomer (B) tends to be improved. In addition, as the solid content increases to 20 mass % or higher, a large amount of energy is not required for drying, and the drying property tends to be improved.

To a polyolefin dispersion (A) used in the present invention, an acidic substance or a basic substances may be added optionally. Examples of an acidic substance include an inorganic acid, such as hydrochloric acid, and sulfuric acid, and an organic acid, such as acetic acid. Examples of a basic substance include an inorganic base, such as sodium hydroxide, and potassium hydroxide, ammonia, triethylamine, diethylamine, ethanolamine, dimethylethanolamine, 2-methyl-2-aminopropanol, triethanolamine, morpholine, and pyridine.

<Radically Polymerizable Monomer (B)>

As a radically polymerizable monomer (B), a vinyl type monomer is preferable because of excellent polymerizability. Examples of a vinyl type monomer include a (meth)acrylic monomer, such as (meth)acrylic acid, and (meth)acrylic acid ester; an aromatic monomer, such as styrene and α-methylstyrene; an amide type monomer, such as (meth)acrylamide, and dimethyl (meth)acrylamide; (meth)acrylonitrile; vinyl acetate; vinyl propionate; and vinyl versatate. These may be used singly, or in combination of two or more kinds thereof. Meanwhile, there is no particular restriction on a vinyl type monomer to be used, insofar as the advantageous effects of the present invention are not strongly compromised.

Among these, from the viewpoints of weather resistance and solvent resistance, a (meth)acrylic acid ester is preferable. Specific examples of a (meth)acrylic acid esters may include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, octyl (meth)acrylate, 2-ethylhexyl (meth)acrylate, nonyl (meth)acrylate, lauryl (meth)acrylate, stearyl (meth)acrylate; a (meth)acrylic acid ester having an aryl group or an aralkyl group having 6 to 12 carbon atoms, such as benzyl (meth)acrylate; dimethylaminoethyl (meth)acrylate, diethylaminoethyl (meth)acrylate, 2-aminoethyl (meth)acrylate, glycidyl (meth)acrylate, 2-methoxyethyl (meth)acrylate, 3-methoxypropyl (meth)acrylate, a poly(ethylene oxide) adduct of (meth)acrylic acid; a (meth)acrylic acid ester having an alkyl group having 1 to 20 carbon atoms and a fluorine atom, such as trifluoromethylmethyl (meth)acrylate, 2-trifluoromethylethyl (meth)acrylate, and 2-perfluoroethylethyl (meth)acrylate. These may be used singly, or in combination of two or more kinds thereof.

Among these, isobutyl methacrylate, butyl acrylate, t-butyl methacrylate, cyclohexyl methacrylate, and styrene are preferable from the viewpoint of adhesion to a polypropylene base material, and butyl acrylate is more preferable.

Further, a radically polymerizable monomer (B) preferably contains a vinyl type monomer having a hydroxy group, because the coating film performance is improved when the obtained aqueous resin dispersion is mixed with a melamine resin, and a crosslinking agent such as an isocyanate to prepare a coating material composition. Examples of a vinyl type monomer containing a hydroxy group include 2-hydroxyethyl (meth)acrylate, 2-hydroxypropyl (meth)acrylate, and 4-hydroxybutyl (meth)acrylate. The content of a vinyl type monomer having a hydroxy group is preferably 30 mass % or less, and more preferably 20 mass % or less in a radically polymerizable monomer (B). When the content of a vinyl type monomer having a hydroxy group is 30 mass % or less, the adhesion to a polypropylene base material tends to be improved.

In the present invention, the amount of a radically polymerizable monomer (B) mixed (amount used) is preferably 0.5 to 2 times the solid component of the polyolefin dispersion (A) in terms of parts by mass. In a case where the rate is 0.5 times or more, the stability of a coating material composition is improved, when an aqueous resin dispersion of the present invention is used for the coating material. Also, in a case where the rate is 2 times or less, the adhesion to a polypropylene base material becomes excellent.

<Surfactant for Emulsion Polymerization (C)>

As a surfactant for emulsion polymerization (C), various surfactants, such as an anionic surfactant, a cationic surfactant, and a nonionic surfactant which has an HLB of 8 or more, may be used. Further, a so-called reactive surfactant having an ethylenic unsaturated bond in the surfactant component may be also used. Although there is no particular restriction on an anionic surfactant, from the viewpoint of improving the storage stability of the resultant aqueous resin dispersion, among others, for example, ADEKA REASOAP SR (trade name, produced by Adeka Corporation), which is a reactive surfactant, or NEOCOL SW-C (trade name, produced by Dai-lchi Kogyo Seiyaku Co., Ltd.), which is a non-reactive surfactant, may be used.

Further, the amount of the solid component of a surfactant for emulsion polymerization (C) mixed (amount used) is preferably 0 to 3 parts by mass, and more preferably 0 to 2 parts by mass with respect to 100 parts by mass of the total amount (solid component) of a radically polymerizable monomer (B) used in the radical polymerization step. When the amount mixed is 3 parts by mass or less, the water resistance of the resultant aqueous resin dispersion tends to be superior.

<Polyether Resin (D)>

In the present invention, the polyolefin dispersion (A) preferably contains a polyether resin (D). That is, the polyolefin dispersion (A) is preferably prepared by dispersing the olefin polymer and a polyether resin (D) in a dispersion medium (water and/or a solvent other than water). As an olefin polymer, an olefinic polymer (A1) is preferred.

As the polyether resin (D), any of a synthetic polymer, a semisynthetic polymer, and a natural polymer may be used insofar as the HLB (Hydrophile Lipophile Balance) calculated by the Griffin method is in a range of 1 to 8. As the HLB of a polyether resin (D) becomes lower below 8, the surface energy of an aqueous resin dispersion decreases, and the impregnating property of a radically polymerizable monomer (B) tends to be improved. The HLB of a polyether resin (D) is preferably from 1 to 6, more preferably from 1 to 4.

A polyether resin (D) used in the present invention is usually obtained by ring-opening polymerization of a cyclic alkylene oxide, or a cyclic alkylene imine. It is only necessary that a polyether resin (D) is contained in a polyolefin dispersion (A), and an olefinic polymer (A1) and a polyether resin (D) may be bonded to each other. It is preferable that an olefinic polymer (A1) and a polyether resin (D) are bonded to each other, because the polyether resin (D) does not bleed out.

There is no restriction on the bonding method between an olefinic polymer (A1) and a polyether resin (D), and examples thereof include a method by which a cyclic alkylene oxide is polymerized in a modified olefinic polymer (A12) having a reactive group by ring-opening polymerization, and a method by which a reactive group in a polyether polyol, a polyetheramine, or the like obtained by ring-opening polymerization, etc., of a cyclic alkylene oxide, a cyclic alkylene imine, or the like, is reacted with a reactive group in a modified olefinic polymer (A12) having the reactive group.

A polyether polyol is a compound having hydroxy groups as a reactive group at both the terminals of a resin having a polyether skeleton. Meanwhile, a polyetheramine is a compound having a primary amino group as a reactive group at one terminal or both the terminals of a resin having a polyether skeleton. As the bonding method, a method by which a polyetheramine obtained by ring-opening polymerization or the like and a reactive group in the polymer (A12) are reacted each other, is preferable.

A polyether resin (D) preferably contains poly(ethylene oxide), or polyethylene imine exhibiting hydrophilicity, and poly(propylene oxide) or poly(propylene imine) exhibiting hydrophobicity as constitutes. In particular, it is more preferable that the polyether resin (D) contains poly(ethylene oxide) and poly(propylene oxide). The HLB of the polyether resin (D) can be adjusted by the number of repeating units of the poly(ethylene oxide) or the poly(propylene oxide).

As a polyether resin (D), for example, a polyetheramine, such as "JEFFAMINE®" (trade name) M series, D series, ED series produced by Huntsman Corporation, or "SURFONAMINE" (trade name) L series may be used.

The polyether resin (D) used in the present invention preferably has one or more reactive groups capable of reacting with a polymer (A12), before bonding with the polymer (A12). Examples of the reactive group include a carboxylic group, a dicarboxylic anhydride group, a dicarboxylic anhydride monoester group, a hydroxy group, an amino group, an epoxy group, and an isocyanate group, and it is preferable that the polyether resin (D) has at least one or more amino group. Since an amino group has high reactivity with various reactive groups, such as a carboxylic group, a carboxylic anhydride group, a glycidyl group, and an isocyanate group, the polymer (A12) and the polyether resin (D) can be bonded to each other easily. The amino group may be any of primary, secondary, and tertiary amino groups, but a primary amino group is preferable.

It is only required that a polyether resin (D) has at least one reactive group, and it is more preferable that the same has only one reactive group, and further preferable that the same has only one amino group as a reactive group. In a case where a polyether resin (D) has two or more reactive groups, when bonded to a polymer (A12), a three-dimensional network structure may be formed and gelation may occur. However, even when there are plural reactive groups, if there exists only one reactive group having higher reactivity than other reactive groups among the plural reactive groups, such resin may be preferably used as a polyether resin (D). For example, a polyether resin (D) having plural hydroxyl groups and one amino group having higher reactivity than the hydroxy groups is a preferred example. The reactivity means the reactivity of a reactive group of a polymer (A12) with a reactive group of a polyether resin (D).

The weight average molecular weight (Mw) of a polyether resin (D) measured using GPC and converted by a calibration curve of polystyrene is preferably from 200 to 200,000. The lower limit value of Mw is more preferably 300, and further preferably 500. The upper limit value of Mw is more preferably 100,000, further preferably 10,000, and still further preferably 3,000. As Mw becomes higher beyond 200, the surface energy of the aqueous resin dispersion decreases so that the wettability tends to be improved. Meanwhile, as Mw becomes lower below 200,000, the viscosity decreases so that the aqueous resin dispersion tends to be prepared more easily. A GPC measurement is carried out using THF or the like as a solvent with a commercially available apparatus by a heretofore known method.

It is preferable that a polyolefin dispersion (A) according to the present invention is obtained by bonding an olefinic polymer (A1) with a polyether resin (D) such that an olefinic polymer (A1):a polyether resin (D) is between 100:1 and 100:100 (mass ratio). The mass ratio is more preferably between 100:5 and 100:70, and further preferably between 100:10 and 100:50. When the mass ratio is within the above range, the adhesion to a polypropylene base material tends to increase.

A polyether resin (D) of the present invention is for dispersing an olefinic polymer (A1) and is not included in the surfactant for emulsion polymerization (C) of the present invention.

<Method for Producing Aqueous Resin Dispersion>

The method for producing an aqueous resin dispersion according to the present invention includes a polymerization step of mixing and polymerizing a polyolefin dispersion (A), a radically polymerizable monomer (B), and a surfactant for emulsion polymerization (C). In the polymerization step the respective components are so mixed that the amount (solid component) of the radically polymerizable monomer (B) mixed at the time of adding a polymerization initiator is 0.5 to 2 times the solid component of the polyolefin dispersion (A) in terms of parts by mass, and the amount of the solid component of the surfactant for emulsion polymerization (C) mixed is 0 to 3 parts by mass with respect to 100 parts by mass of the total amount (solid component) of the radically polymerizable monomer (B) to be used for producing the aqueous resin dispersion.

There is no particular restriction on the method of mixing and polymerizing a polyolefin dispersion (A), a radically polymerizable monomer (B), and a surfactant for emulsion polymerization (C), insofar as the amount (solid component of the radically polymerizable monomer (B) mixed and the amount of the solid component of the surfactant for emulsion polymerization (C) mixed satisfy the aforedescribed requirements and unless advantageous effects of the present invention are impaired. As the polymerization method, for example, all-in polymerization and/or drop-wise polymerization may be used. Herein, all-in polymerization is a method by which a certain amount of a monomer and a polymerization initiator are charged and polymerized at one time. Meanwhile, drop-wise polymerization is a method by which a monomer is supplied drop-wise and polymerized. From the viewpoints of the polymerization stability and adhesion to a propylene base material, the all-in polymerization is preferable. In the present invention, the all-in polymerization may be carried out, for example, in the presence of a polyolefin dispersion (A) and a surfactant for emulsion polymerization, a radically polymerizable monomer (B) 0.5 to 2 times the solid component of the polyolefin dispersion (A) in terms of parts by mass is mixed, and then the radically polymerizable monomer (B) is radically polymerized at a time by adding a polymerization initiator. Meanwhile, the drop-wise polymerization may be carried out, for example, by drop-wise addition of the radically polymerizable monomer (B) into the polyolefin dispersion (A) in performing radical polymerization.

In a production method of the present invention, the polymerization step preferably includes an operation of polymerizing 50 to 100 mass % of all the radically polymerizable monomer (B) used for producing an aqueous resin dispersion with a polymerization initiator by all-in polymerization. The proportion of the radically polymerizable monomer (B) undergoing the all-in polymerization is more preferably 70 to 100 mass %, further preferably 80 to 100 mass %, especially preferably 90 to 100 mass %, and most preferably 100 mass % with respect to the total amount of the radically polymerizable monomer (B). The higher this proportion is, the better the stability of the coating material composition prepared with the resultant aqueous resin dispersion becomes. Also, the smaller this proportion is, the better the adhesion to a polypropylene base material becomes.

Examples of a method of performing all-in polymerization of 50 to 100 mass % of the total amount of the radically polymerizable monomer (B) include a method by which a polyolefin dispersion (A), a surfactant for emulsion polymerization (C), and 50 to 100 mass % of the total amount of the radically polymerizable monomer (B) are charged in a polymerization vessel, and then a polymerization initiator is added to perform all-in polymerization of the radically polymerizable monomer (B), and a method by which a polyolefin dispersion (A), a surfactant for emulsion polymerization (C), and a polymerization initiator are charged in a polymerization vessel, and then 50 to 100 mass % of the total amount of the radically polymerizable monomer (B) is charged at a time to perform all-in polymerization of the radically polymerizable monomer (B). The rest of the radically polymerizable monomer (B) not used in the all-in polymerization may be polymerized before or after the all-in polymerization by all-in polymerization, drop-wise polymerization, or the like.

As a polymerization initiator, those generally used for radical polymerization may be used. Specific examples thereof include a persulfate, such as potassium persulfate, sodium persulfate, and ammonium persulfate; an oil-soluble azo compound, such as azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), and 2-phenylazo-4-methoxy-2,4-dimethylvaleronitrile; an water-soluble azo compound, such as 2,2'-azobis{2-methyl-N-[1,1-bis(hydroxymethyl)-2-hydroxyethyl]propionamide}, 2,2'-azobis{2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane] and salts thereof, 2,2'-azobis[2-(2-imidazolin-2-yl)propane] and salts thereof, 2,2'-azobis{2-[1-(2-hydroxyethyl)-2-imidazolin-2-yl]propane} and salts thereof, 2,2'-azobis(2-methylpropionamidine) and salts thereof, and 2,2'-azobis[N-(2-carboxyethyl)-2-methylpropionamidine]; and an organic peroxide, such as benzoyl peroxide, cumene hydroperoxide, t-butyl hydroperoxide, t-butylperoxy-2-ethyl hexanoate, and t-butylperoxy isobutyrate. These polymerization initiators may be used singly, or in combination of two or more kinds thereof.

In the present invention, a redox polymerization reaction may be carried out by further adding a reducing agent. In particular, from the viewpoint of polymerization stability, it is preferable to perform a redox type polymerization reaction using an organic peroxide as a polymerization initiator, and ferrous sulfate, isoascorbic acid, or the like as a reducing agent.

A polymerization initiator is preferably used at a rate of 1 part by mass or less with respect to 100 parts by mass of the radically polymerizable monomer (B) (solid component), because the resultant aqueous resin dispersion is superior in adhesion to a polypropylene base material. The amount of the polymerization initiator used is more preferably 0.5 parts by mass or less.

There is no particular restriction on the method of adding a polymerization initiator, unless advantageous effects of the present invention are strongly impaired. As the addition method, for example, a method by which all the polymerization initiator is added at one time, or a drop-wise method may be applied. From the viewpoint of polymerization stability, it is preferable to add the polymerization initiator at one time.

There is no particular restriction on the polymerization temperature, unless advantageous effects of the present invention are strongly impaired. It is preferably 70° C. or less, and more preferably 60° C. or less from the viewpoint of adhesion of the resultant aqueous resin dispersion to a polypropylene base material.

Further, in the present invention, in conducting a polymerization reaction, a known chain transfer agent, such as n-dodecyl mercaptan, t-dodecyl mercaptan, and an a-methyl styrene dimer, may be used as a molecular weight regulator.

After an aqueous resin dispersion is produced by the polymerization reaction, and cooled down, in collecting the aqueous resin dispersion, it is preferable to carry out a filtration operation in order to prevent contamination with foreign matters or cullet. As for the filtration method, a known method may be used. For example, a nylon mesh, a bag filter, a filter paper, a metal mesh, or the like may be used.

An aqueous resin dispersion obtained by a production method of the present invention can be used for a primer, a coating material, an adhesive, an ink binder, a compatibilizer between a polyolefin and a different material, etc., and is particularly useful for a primer, an adhesive, and an ink binder. Examples of the applications thereof may include an automobile coating material for an automotive interior or exterior, a coating material for household appliances, such as a mobile phone, and a personal computer, a coating material for a building material, and a heat sealant. Among these, they are particularly preferable for a primer for a plastic base material, especially for a polypropylene base material.

In a case where an aqueous resin dispersion according to the present invention is used for a coating material, the constituent of the coating composition may optionally contain, in addition to an aqueous resin dispersion according to the present invention, various additives, such as an inorganic filler, resin beads, a film forming aid, a base material wetting agent, a base material humectant, an acrylic resin, a urethane resin, a polyester resin, a colorant, a defoaming agent, and a thickener. As such additives, those known may be used.

Further, for purpose of increasing the drying speed, or forming a surface exhibiting nice finish feeling, the coating composition may contain an organic solvent as a film forming aid. Examples of the organic solvent include an alcohol, such as methanol, ethanol and isopropanol; a ketone, such as acetone; a glycol, such as ethylene glycol, propylene glycol, ethylene glycol monobutyl ether, diethylene glycol monobutyl ether, propylene glycol monomethyl ether, and ethers thereof.

EXAMPLES

The present invention will be described below in more detail by way of Examples and Comparative Examples. Meanwhile, "part" in Examples represents "part by mass". The initial adhesion and water resistance of an aqueous resin dispersion were evaluated by the following methods.
<Evaluation of Aqueous Resin Dispersion>
1. Initial Adhesion To 100 parts of the solid component of an aqueous resin dispersion, 60 parts of diethylene glycol monobutyl ether as a film forming aid, and 3 parts of TEGO WET KL-245 (produced by Evonik Industries AG) as a base material wetting agent were added, and the mixture was stirred using a homogenizer (POLYTRON PT-3100) at 700 rpm for 5 min. Left standing at room temperature for 1 day, then the mixture was filtrated with a 300 mesh screen to obtain a water-based coating material.

Next, the surface of a 3 mm-thick substrate molded from a polypropylene base material ("TSOP-6," produced by Japan Polypropylene Corp.) was cleaned with isopropyl alcohol. The obtained water-based coating material was applied to the substrate by bar coating such that the dry film thickness became 20 μm, allowed to set at room temperature for 10 min, and then dried in a safe vent dryer in an atmosphere of 90° C. for 30 min to form a coating film. This was left standing at room temperature for 1 day to obtain a test piece.

Then, on the coating film side of the test piece, 11 cross-cuts deep enough to reach the base material were made at intervals of 1 mm in both length and width directions to make 100 cross-cut squares. Then, after sticking a cellophane adhesive tape over the cross-cut squares, the adhesive tape was peeled abruptly, and the resultant condition of the coating film was observed, and the number of squares where the coating film was detached (detached squares) was counted. The base material adhesion was evaluated based on the following rating criteria.
○ (Excellent): 0 to 19 detached squares out of 100 squares
Δ (Average): 20 to 80 detached squares out of 100 squares
x (Bad): 81 to 100 detached squares out of 100 squares
2. Water Resistance (Mass Decrement)

The surface of a glass substrate was cleaned with isopropyl alcohol. The obtained aqueous resin dispersion was coated on the glass substrate such that the dry film thickness became 100 μm. The plate was dried in a safe vent dryer in an atmosphere of 90° C. for 30 min to form a coating film. This was left standing at room temperature for 1 day and the coating film was peeled from the glass substrate to obtain a test piece.

The prepared test piece was cut into 10 mm×10 mm and placed in a sample bottle such that the mass (initial mass: W1) became 0.2 g. After adding 100 mL of water to the sample bottle, the bottle was stored at 40° C. for 10 days in a thermostat. After the storage, the test piece was taken out and the mass (mass after 10 days at 40° C.: W2) was measured, and the mass decrement was calculated by the following calculation formula.

Mass decrement (%)=[($W1(g)$−$W2(g)$)/$W1(g)$]×100

○ (Excellent): Mass decrement is less than 4.00%
Δ (Average): Mass decrement is 4.00% or more and less than 10.00%
x (Bad): Mass decrement is 10.00% or more Production Example 1: Production of Maleic Anhydride-Modified Propylene Type Copolymer Two hundred (200) kg of TAFMER® XM-7070 (trade name, produced by Mitsui Chemicals, Inc., melting point: 75° C., propylene content: 74 mol %, weight average molecular weight (Mw): 250,000 (converted to polypropylene), molecular weight distribution (Mw/Mn): 2.2), which was a propylene/butene copolymer (corresponding to the olefinic polymer) polymerized with a metallocene catalyst, and 5 kg of maleic anhydride were dry-blended in a super mixer. Thereafter, the mixture was kneaded using a twin-screw extruder (trade name: TEX 54 all, produced by Japan Steel Works, Ltd.) under the conditions that the cylinder temperature at a kneading zone was 200° C., the screw rotation speed was 125 rpm, and the discharge rate was 80 kg/hour, while continuing midway feed of t-butyl peroxy isopropyl monocarbonate (polymerization initiator, trade name: PERBUTYL® I, produced by NOF Corporation) with a Liquid injection pump in an amount of 1 part by mass with respect to 100 parts by mass of the propylene/butene copolymer, to obtain a maleic anhydride-modified propylene/butene copolymer (graft polymer (A12b)) in a pellet form. The physical properties of the obtained maleic anhydride-modified propylene/butene copolymer are shown below.

Content (graft rate) of a maleic anhydride group: 1.0 mass % (0.1 mmol/g as maleic anhydride group, and 0.2 mmol/g as carboxylic acid group)
Weight average molecular weight (Mw): 156,000 (converted to polystyrene)
Number average molecular weight (Mn): 84,000

Production Example 2: Production of Polyolefin Dispersion (A)

Into a glass flask equipped with a reflux condenser, a thermometer, and a stirrer, 50 g of the maleic anhydride-modified propylene/butene copolymer obtained in Production Example 1, 50 g of TAFMER® XM-7070, and 50 g of toluene were placed, the interior of the vessel was replaced with nitrogen gas, and the temperature was elevated to 110° C. After the temperature elevation, 2.0 g of maleic anhydride was added, and 1 g of t-butyl peroxy isopropyl monocarbonate (trade name: PERBUTYL® I, produced by NOF Corporation) was further added thereto, and the mixture was stirred at the same temperature for 7 hours allowing the reaction.

The content (graft rate) of the maleic anhydride group in the obtained maleic anhydride-modified propylene/butene copolymer was 2.0 mass % (0.2 mmol/g as a maleic anhydride group, and 0.4 mmol/g as a carboxylic group).

After completion of the reaction, the system was cooled to near room temperature, 70 g of toluene was added, and then 10 g (equivalent to 20 parts by mass with respect to 100 parts by mass of the maleic anhydride-modified propylene/butene copolymer) of JEFFAMINE® M-2005 (trade name, produced by Huntsman Corporation, HLB: 3, number average molecular weight: 2000) dissolved in 90 g of 2-propanol was added as a polyether resin (D) and the reaction was brought forward at 70° C. for 1 hour. Thereafter, 10 g (equivalent to 10 parts by mass with respect to 100 parts by mass of the maleic anhydride-modified propylene/butene copolymer) of JEFFAMINE® M-1000 (trade name, produced by Huntsman Corporation, HLB: 17, number average molecular weight: 1000) dissolved in 90 g of 2-propanol was added as a polyether resin (D) and the reaction was brought forward at 70° C. for 1 hour.

Thereafter, 2 g of dimethylethanolamine, and 54 g of water were added to neutralize the system. The temperature of the obtained reaction solution was kept at 45° C. with heating and stirring, the pressure in the system was reduced while dropping 300 g of water to distill off toluene and 2-propanol under reduced pressure until the polymer concentration reached 30 mass %. Thus, a milk white polyolefin dispersion (A) having an average particle diameter of 70 nm was obtained. The content of the solid component in the polyolefin dispersion (A) was 30 mass %.

Example 1: Production of Aqueous Resin Dispersion

Into a flask equipped with a stirrer, a reflux condenser, and a temperature controller, 333.3 parts (100 parts of solid component) of the polyolefin dispersion (A) obtained in Production Example 2, 119.6 parts of deionized water, and 8.0 parts (2 parts of solid component) of ADEKA REASOAP SR-1025 (trade name, produced by Adeka Corporation: 25 parts of solid component) as a surfactant for emulsion polymerization (C) were charged, and the temperature thereof was raised to 30° C. Next, 100 parts of butyl acrylate were added as a radically polymerizable monomer (B), and the temperature was raised to 50° C. and held for 1 hour. Further, 0.02 parts of PERBUTYL® H69 (trade name, produced by NOF Corporation, solid component 69 mass %) as a polymerization initiator, 0.0002 parts of ferrous sulfate as a reducing agent, 0.00027 parts of ethylenediaminetetraacetic acid (EDTA), 0.08 parts of sodium isoascorbate monohydrate, and 1 part of deionized water were added, and polymerization was initiated.

After detecting an exothermic peak of polymerization, 0.03 parts of PERBUTYL® H69, and 10.0 parts of deionized water were added dropwise over 15 min. After completion of drop-wise addition, ripening was carried out at 60° C.

for 30 min to obtain an aqueous resin dispersion. With respect to the obtained aqueous resin dispersion, the initial adhesion, and water resistance were evaluated. The evaluation results are shown in Table 1.

Examples 2 to 7 and Comparative Examples 2 and 3

An aqueous resin dispersion was prepared in the same manner as in Example 1 except that the polyolefin dispersion (A), the radically polymerizable monomer (B), the surfactant for emulsion polymerization (C), and the polymerization initiator as well as the mixing ratio thereof were changed as set forth in Table 1. With respect to the obtained aqueous resin dispersion, the initial adhesion, and water resistance were evaluated. The evaluation results are shown in Table 1.

Comparative Example 1: Production of Aqueous Resin Dispersion

Into a flask equipped with a stirrer, a reflux condenser, and a temperature controller, 333.3 parts (100 parts of solid component) of the polyolefin dispersion (A) obtained in Production Example 2, and 28.5 parts of deionized water were charged and the temperature was raised to 50° C. and held for 1 hour. Subsequently, 0.0002 parts of ferrous sulfate as a reducing agent, 0.00027 parts of ethylenediaminetetraacetic acid (EDTA), 0.08 parts of sodium isoascorbate monohydrate, and 1 part of deionized water were added, and then a pre-emulsion containing 100.0 parts of butyl acrylate as a radically polymerizable monomer (B), 16.0 parts (4 parts of solid component) of ADEKA REASOAP SR-1025 as a surfactant for emulsion polymerization (C), and 58.0 parts of deionized water was added dropwise over 2 hours. At the same time, 0.05 parts of PERBUTYL® H69 as a polymerization initiator, and 45.0 parts of deionized water were dropped in parallel over a period of 2.15 hours for polymerization. After completion of drop-wise addition, ripening was carried out at 50° C. for 30 min to obtain an aqueous resin dispersion. With respect to the obtained aqueous resin dispersion, the initial adhesion and water resistance were evaluated. The evaluation results are shown in Table 1.

Comparative Example 4

An aqueous resin dispersion was obtained in the same manner as in Comparative Example 1 except that the surfactant for emulsion polymerization (C) was changed as set forth in Table 1. With respect to the obtained aqueous resin dispersion, the initial adhesion and water resistance were evaluated. The evaluation results are shown in Table 1.

TABLE 1

| | | Example 1 | Example 2 | Example 3 | Example 4 | Example 5 | Example 6 |
|---|---|---|---|---|---|---|---|
| Polyolefin dispersion (A) Solid component part by mass | Dispersion of Production Example (2) | 100 | 100 | 100 | 100 | 100 | — |
| | HARDLEN EW5303 | — | — | — | — | — | 100 |
| Radically polymerizable monomer (B) part by mass | Butyl acrylate Methyl methacrylate | 100 | 100 | 100 | 100 | 150 | 100 |
| Surfactant for emulsion polymerization (C) | ADEKA REASOAP SR1025 | 2 | — | 2 | — | 3 | 2 |
| Solid component part by mass | NEOCOL SW-C | — | 2 | — | — | — | — |
| Initiator part by mass | PERBUTYL H69 | 0.05 | 0.05 | 0.25 | 0.05 | 0.075 | 0.05 |
| Mixing ratio before polymerization | (B)/(A) | 1 | 1 | 1 | 1 | 1.5 | 1 |
| Evaluation of aqueous resin dispersion | Initial adhesion (Detached squares/Total squares) | ○ (0/100) | ○ (0/100) | ○ (0/100) | ○ (0/100) | ○ (0/100) | Δ (20/100) |
| | Water resistance (Mass decrement) | ○ 3.48% | ○ 2.68% | ○ 2.67% | ○ 2.90% | ○ 3.88% | Δ 4.98% |

| | | Example 7 | Comparative Example 1 | Comparative Example 2 | Comparative Example 3 | Comparative Example 4 |
|---|---|---|---|---|---|---|
| Polyolefin dispersion (A) Solid component part by mass | Dispersion of Production Example (2) | 100 | 100 | 100 | 100 | 100 |
| | HARDLEN EW5303 | — | — | — | — | — |
| Radically polymerizable monomer (B) part by mass | Butyl acrylate Methyl methacrylate | 50 50 | 100 | 100 | 100 | 50 50 |
| Surfactant for emulsion polymerization (C) Solid component part by mass | ADEKA REASOAP SR1025 | 2 | 4 | 6 | 4 | 2 |
| | NEOCOL SW-C | — | — | — | — | — |

TABLE 1-continued

|  |  |  |  |  |  |  |
|---|---|---|---|---|---|---|
| Initiator part by mass | PERBUTYL H69 | 0.05 | 0.05 | 0.05 | 0.05 | 0.05 |
| Mixing ratio before polymerization | (B)/(A) | 1 | 0.01> | 1 | 1 | 0.01> |
| Evaluation of aqueous resin dispersion | Initial adhesion (Detached squares/Total squares) | ○ (0/100) | x (100/100) | ○ (0/100) | ○ (0/100) | x (100/100) |
|  | Water resistance (Mass decrement) | ○ 2.70% | x >20% | Δ 6.01% | Δ 6.79% | x >20% |

As HARDLEN® EW5303 and NEOCOL SW-C in Table 1, the followings were used.

HARDLEN® EW5303: chlorinated polyolefin dispersion, trade name, produced by Toyobo Co., Ltd.

NEOCOL SW-C: Trade name, produced by Dai-Ichi Kogyo Seiyaku Co., Ltd.

As shown in Table 1, an aqueous resin dispersion was produced in Examples 1 to 7 of the present invention by polymerizing a radically polymerizable monomer (B) 0.5 to 2 times the solid component of the polyolefin dispersion (A) in terms of parts by mass and 100 mass % of the total amount of the monomer by all-in polymerization. Further, the mixed ratio of the solid component of a surfactant for emulsion polymerization (C) was 3 mass % or less with respect to the radically polymerizable monomer (B). Therefore, the obtained coating film was excellent in initial adhesion and water resistance.

Meanwhile, an aqueous resin dispersion was produced in Comparative Example 1 by dropping and polymerizing a polyolefin dispersion (A) and a radically polymerizable monomer (B) 0.01 times the solid component of the polyolefin dispersion (A) in terms of parts by mass at the time of addition of a polymerization initiator. Therefore, the obtained coating film was inferior in adhesion and water resistance. Further, in the cases of aqueous resin dispersions of Comparative Examples 3 and 4, the mixed ratio of the solid component of the surfactant for emulsion polymerization (C) was more than 3 mass % with respect to the radically polymerizable monomer (B), and therefore the obtained coating film was inferior in water resistance.

The invention claimed is:

1. A method for producing an aqueous resin dispersion, comprising a polymerization step of mixing and polymerizing a polyolefin dispersion (A), a radically polymerizable monomer (B), and a surfactant for emulsion polymerization (C), wherein in the polymerization step, the amount of the radically polymerizable monomer (B) mixed at the time of adding a polymerization initiator is 0.5 to 2 times the solid component of the polyolefin dispersion (A) in terms of parts by mass, and the amount of the solid component of the surfactant for emulsion polymerization (C) mixed is 0.05 to 3 parts by mass with respect to 100 parts by mass of the total amount of the radically polymerizable monomer (B), wherein the polymerization step includes an operation of all-in polymerization of 50 to 100 mass % of all the radically polymerizable monomer (B) used for production of the aqueous resin dispersion with a polymerization initiator, and wherein the polyolefin dispersion (A) comprises a polyolefin, and a polyether resin (D) having a HLB of 1 to 8 calculated by the Griffin method dispersed in a dispersion medium.

2. The method for producing an aqueous resin dispersion according to claim 1, wherein the polyolefin dispersion (A) does not contain a halogen atom.

3. The method for producing an aqueous resin dispersion according to claim 1, wherein the aqueous resin dispersion is used for a primer.

\* \* \* \* \*